US012378098B2

(12) United States Patent
Berg et al.

(10) Patent No.: US 12,378,098 B2
(45) Date of Patent: Aug. 5, 2025

(54) LIFTING SYSTEMS FOR SUBSEA PIPELINES AND METHODS FOR INSTALLING LIFTING SYSTEMS

(71) Applicant: Subsea 7 Norway AS, Stavanger (NO)

(72) Inventors: Anders Veungen Berg, Stavanger (NO); Odd Vegard Skrunes, Stavanger (NO); Jorn Knutsen, Sandnes (NO); Gabriel Grodem, Rennesoy (NO); Stig Hjorth, Klepp Stasjon (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 17/914,753

(22) PCT Filed: Mar. 29, 2021

(86) PCT No.: PCT/EP2021/058211
§ 371 (c)(1),
(2) Date: Sep. 26, 2022

(87) PCT Pub. No.: WO2021/191475
PCT Pub. Date: Sep. 30, 2021

(65) Prior Publication Data
US 2023/0117015 A1    Apr. 20, 2023

(30) Foreign Application Priority Data
Mar. 27, 2020 (GB) ..................... 2004503

(51) Int. Cl.
*F16L 1/26* (2006.01)
*B66C 5/10* (2006.01)
*F16L 1/20* (2006.01)

(52) U.S. Cl.
CPC . *B66C 5/10* (2013.01); *F16L 1/26* (2013.01)

(58) Field of Classification Search
CPC .................. F16L 1/26; F16L 1/20; F16L 1/16
See application file for complete search history.

(56) References Cited

U.S. PATENT DOCUMENTS

| 4,028,903 A | 6/1977 | Dietrich |
| 4,076,130 A | 2/1978 | Sumner |

(Continued)

FOREIGN PATENT DOCUMENTS

| GB | 2 515 506 A | 12/2014 |
| WO | 94/08166 A1 | 4/1994 |
| WO | 2012/134680 A2 | 10/2012 |

OTHER PUBLICATIONS

International Preliminary Report on Patentability received in corresponding International Application No. PCT/EP2021/058211 dated May 24, 2022.

(Continued)

*Primary Examiner* — Sean D Andrish
(74) *Attorney, Agent, or Firm* — Mattingly & Malur, PC

(57) ABSTRACT

A lifting system and a method of installing a lifting frame for lifting a subsea pipeline has paired subsea foundations spaced apart from each other by a gap through which the pipeline extends. A removable lifting frame is mounted on the foundations to bridge over the pipeline disposed in the gap. The lifting frame comprises a pair of feet that are cooperable with respective support formations on the foundations. One support formation defines a hinge component to restrain one of the feet for pivotal movement. The other support formation defines a platform on which the other foot can rest in various positions within a support area. This compensates for differences in level, spacing or alignment between the foundations. The lifting frame can be transferred to another location by dismounting it from a first pair of foundations and then mounting it onto a second pair of foundations in a corresponding manner.

35 Claims, 14 Drawing Sheets

(56) References Cited

U.S. PATENT DOCUMENTS

| | | | |
|---|---|---|---|
| 4,229,121 A * | 10/1980 | Brown | F16L 1/26 |
| | | | 405/184.5 |
| 4,268,190 A | 5/1981 | Tesson | |
| 5,437,517 A | 8/1995 | Carrioli et al. | |
| 8,449,221 B1 | 5/2013 | Lugo et al. | |
| 2009/0058076 A1 | 3/2009 | Giles et al. | |
| 2019/0271132 A1 | 9/2019 | Meling et al. | |

OTHER PUBLICATIONS

Written Opinion received in corresponding International Application No. PCT/EP2021/058211, Written Opinion dated Jul. 20, 2021.
International Search Report received in corresponding International Application No. PCT/EP2021/058211, International Search Report dated Jul. 20, 2021.
United Kingdom Search Report received in corresponding United Kingdom Application No. GB2004503.5 dated Sep. 9, 2020.

* cited by examiner

LIFTING SYSTEMS FOR SUBSEA PIPELINES AND METHODS FOR INSTALLING LIFTING SYSTEMS

This invention relates to lifting systems for subsea pipelines, such systems comprising lifting frames.

Lifting frames are used to lift a subsea pipeline from the seabed when performing interventions such as repairs. Examples of lifting frames are disclosed in U.S. Pat. Nos. 4,028,903, 4,268,190 and 5,437,517.

Typically, a pipeline lifting frame is an H-shaped or n-shaped structure that comprises parallel upright branches or columns joined by a horizontal beam that straddles the pipeline. Each column is supported by a foundation, most commonly comprising a flat mudmat to spread the load across the seabed soil. The beam extends over the pipeline, spanning the gap between the columns, and carries a lifting system for engaging and lifting the pipeline from the seabed beneath. The lifting system usually comprises a clamp, jaws or claws for gripping and engaging the pipeline before lifting it.

As exemplified in U.S. Pat. No. 8,449,221, multiple lifting frames are required in series to perform an intervention. However, as interventions are performed locally on discrete portions of the pipeline, lifting frames are not needed at the same time along the full length of the pipeline. Consequently, as lifting frames are expensive, it is desirable for them to be repositionable between different locations at which successive interventions are required. Relocation in this way minimises the number of lifting frames that are required to be installed underwater at any one time.

Thus, for example, WO 2012/134680 discloses placing a longitudinal series of pile foundations beside a subsea pipeline. Each pile can support a respective articulated pipeline manipulator arm. Together, a series of those manipulator arms can grip and lift the pipeline. After completing an intervention at a given location along the pipeline, the manipulator arms can be removed from their piles and relocated to another set of piles along the pipeline to perform a subsequent intervention on the pipeline at another location.

The solution disclosed in WO 2012/134680 may be feasible for compact manipulator arms but it is not suitable for supporting bulky lifting frames that bridge over the pipeline. Such lifting frames are difficult to handle, requiring large installation vessels that are expensive to acquire and to operate. Also, it is desirable to complete relocation as quickly as possible so as not to miss a weather window in which that operation can be performed safely. The present invention therefore seeks to simplify the relocation of bulky lifting frames.

Against this background, the invention resides in a lifting system for a subsea pipeline, the system comprising: at least one pair of subsea foundations that are installed at the seabed and spaced apart from each other to define a gap between them through which the pipeline extends; and a removable lifting frame that is arranged to be removably mountable on the installed foundations to bridge over the pipeline disposed in the gap. The lifting frame comprises a pair of feet that are cooperable with respective support formations on the respective foundations. A first one of the support formations comprises a hinge component to restrain one of the feet for pivotal movement relative to that support formation. A second one of the support formations is shaped to define a platform on which the other foot can rest in any of various positions within a support area.

The first support formation may comprise a support post that defines the hinge component.

The lifting frame may comprise an engagement formation that defines another hinge component of the lifting frame. The engagement formation may comprise an opening for receiving the support post. The engagement formation may extend outwardly from a leg of the lifting frame.

The support post may extend upwardly from the foundation to define a vertical axis about which the lifting frame can pivot when the support post is received in the opening of the engagement formation.

The first support formation may comprise a plurality of guide posts arranged to delimit a support area of the first support formation in which one of the feet can rest in any of various positions. The guide posts may extend vertically upwards from the foundation to a lesser extent than the support post.

The support formations may each comprise an upwardly-opening, downwardly-narrowing channel.

The first support formation or the second support formation may further comprise end walls that are positioned to restrain longitudinal movement of one of the feet of the lifting frame when engaged with the channel.

The feet may lie in a common plane, may be elongate and may extend substantially parallel to each other. The feet may be substantially identical, at least in cross-section.

At least a downward side of each foot may be of substantially part-circular or part-elliptical curvature. For example, each foot may be cylindrical in outer shape.

The foundations are suitably arranged to be embedded in seabed soil. For example, each foundation may comprise at least one suction pile.

The lifting system may comprise at least two pairs of foundations at different locations. At any given time, a lifting frame may be mounted on one of those pairs whereas another of those pairs may not have a lifting frame mounted on it. This leaves space to transfer the lifting frame between locations as and when required.

The first support formation may be shaped to define the hinge component. The first support formation may comprise a base of substantially part-circular or part-elliptical curvature. Conversely, the second support formation may comprise a substantially flat base that is substantially wider than either foot of the lifting frame. The first support formation or the second support formation may be open-ended.

The lifting frame is suitably mountable on the foundations in at least two orientations about a vertical axis. Those orientations may, for example, be 180° apart about the vertical axis. Those orientations may be limited by the guide posts of the first support formation.

The inventive concept embraces a corresponding method of installing a lifting frame for lifting a subsea pipeline. The method comprises: preinstalling at the seabed at least a first pair of subsea foundations that are spaced apart from each other to define a gap between them through which the pipeline extends; and mounting the lifting frame onto the preinstalled foundations to bridge over the pipeline disposed in the gap. A pair of feet of the lifting frame then cooperate with respective support formations on the respective foundations, one of the feet being constrained to hinge about or pivot relative to a first one of the support formations and the other foot resting on a second one of the support formations with freedom of positioning within a support area of that support formation.

The method may comprise engaging an engagement formation of the lifting frame and a support post of the first support formation to define a hinge. The method may further comprise pivoting the lifting frame about a vertical axis defined by the support post.

A difference in level between the foundations of the pair can be compensated for by allowing the lifting frame to pivot about the first support formation. Similarly, a difference in lateral spacing or longitudinal alignment between the foundations of the pair can be compensated for by allowing the lifting frame to adopt different positions relative to the second support formation.

The method of the invention may further comprise subsequently transferring the lifting frame to another location by dismounting the lifting frame from the first pair of foundations and then mounting the lifting frame onto a second pair of like foundations in a corresponding manner. That other location may be along the same pipeline or on a different pipeline.

The invention provides a subsea pipe lifting and alignment system comprising a lifting frame, such as an H-frame, and a separate foundation that is required because the seabed soil is soft. The system is apt to be used for emergency pipeline repairs. For example, four identical H-frames may be deployed to the seabed to be able to lift up a length of a subsea pipeline for access by repair tooling.

Embedded foundations such as suction anchors are preferred for soft soils. The foundations are deployed first and positioned correctly in the seabed. The lifting frames are then deployed and installed on top of the preinstalled foundations.

The invention provides a novel mechanical interface between the lifting frames and the foundations that can compensate for dimensional variations in the foundations. This eases the installation of a subsea pipe lifting and alignment system, reducing the cost of installation and shortening the weather window that is required to complete installation. The invention also reduces the weight of steel that is required to fabricate and to support the frame.

By virtue of the invention, a standardised system may be developed for use in more than one emergency pipeline repair system project. This allows beneficial economies of scale.

Embodiments of the invention provide a relocatable subsea pipeline lifting system comprising at least two pairs of foundations located along the pipeline, each foundation of a pair being on each side of the pipeline. The foundations may, for example, be pile foundations such as suction piles.

One foundation of a pair comprises a receptacle for a hinge and the other foundation of the pair comprises a receptacle for a sliding shoe. The system further comprises at least one pipeline lifting frame comprising two feet and lifting equipment, one foot comprising a hinge and the other foot comprising a sliding shoe.

The hinge and the sliding shoe may both be substantially the same, for example identical tubular members, in order to be able to reverse the frame.

Embodiments of the invention also implement a method for relocating a pipeline lifting frame, the frame comprising two feet, one foot comprising a hinge and the other foot comprising a sliding shoe. The method comprises: installing at least two pairs of foundations along the pipeline, wherein each foundation of the pair is on each side of the pipeline, one foundation of a pair comprises a receptacle for a hinge and the other foundation of the pair comprises a receptacle for a sliding shoe. The pipeline lifting frame is installed on one pair of foundations, operated and then lifted to another pair of foundations.

In summary, the invention provides a lifting system for a subsea pipeline. The system comprises paired subsea foundations that are spaced apart from each other to define a gap between them through which the pipeline extends. A removable lifting frame is mounted on the foundations to bridge over the pipeline disposed in the gap.

The lifting frame comprises a pair of feet that are cooperable with respective support formations on the foundations. One support formation defines a hinge component to restrain one of the feet for pivotal movement. The other support formation defines a platform on which the other foot can rest in any of various positions within a support area. This compensates for differences in level, spacing or alignment between the foundations.

The lifting frame can be transferred to another location by removing it from a first pair of foundations and then mounting it onto a second pair of like foundations in a corresponding manner.

In order that the invention may be more readily understood, reference will now be made, by way of example, to the accompanying drawings in which.

Figure 3:
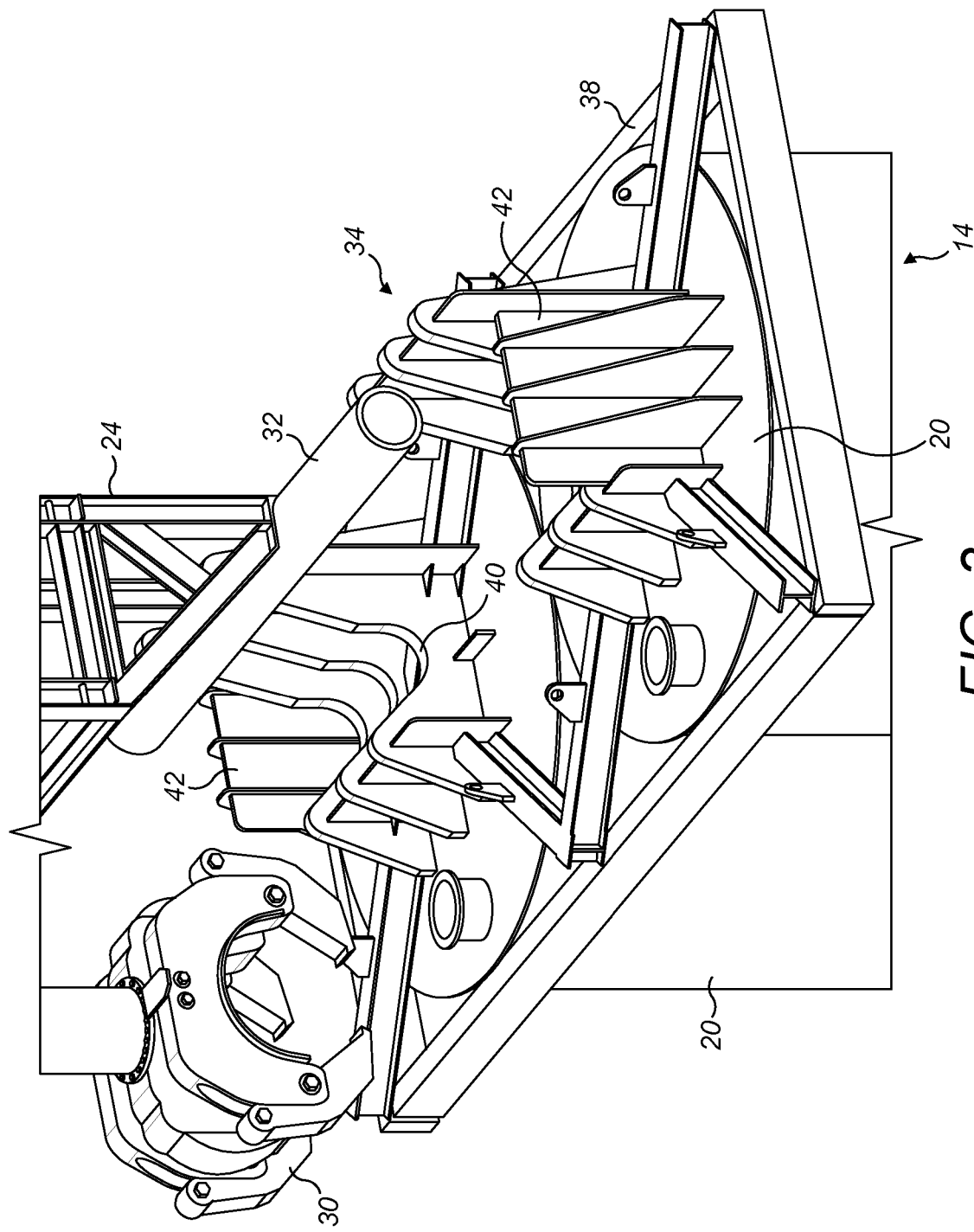
FIG. 3 is a detail perspective view of the system of FIGS. 1 and 2, showing one of the feet of the lifting frame approaching engagement with a support formation that serves as a component of a hinge.
Figure 4:
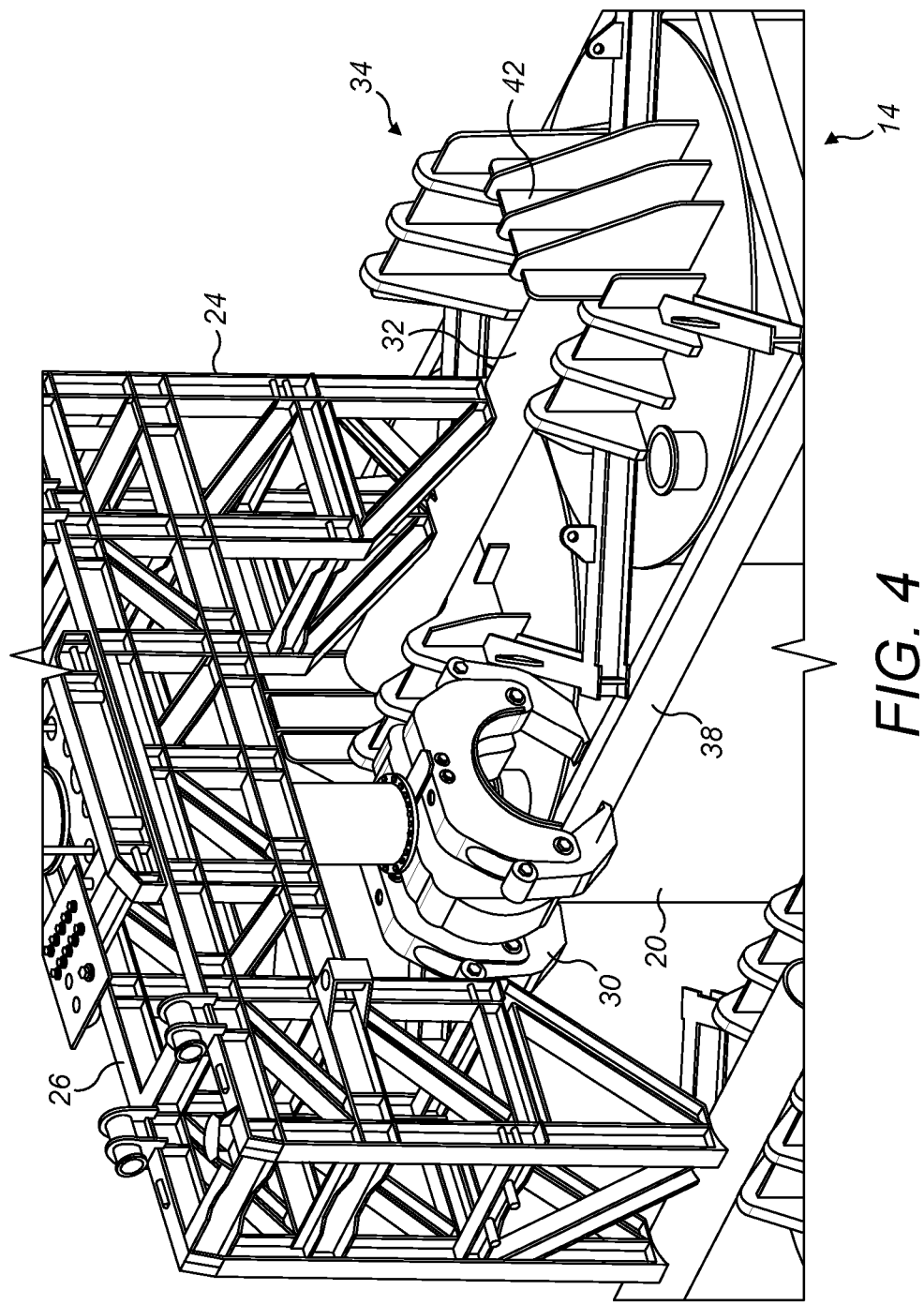
Figure 5A:
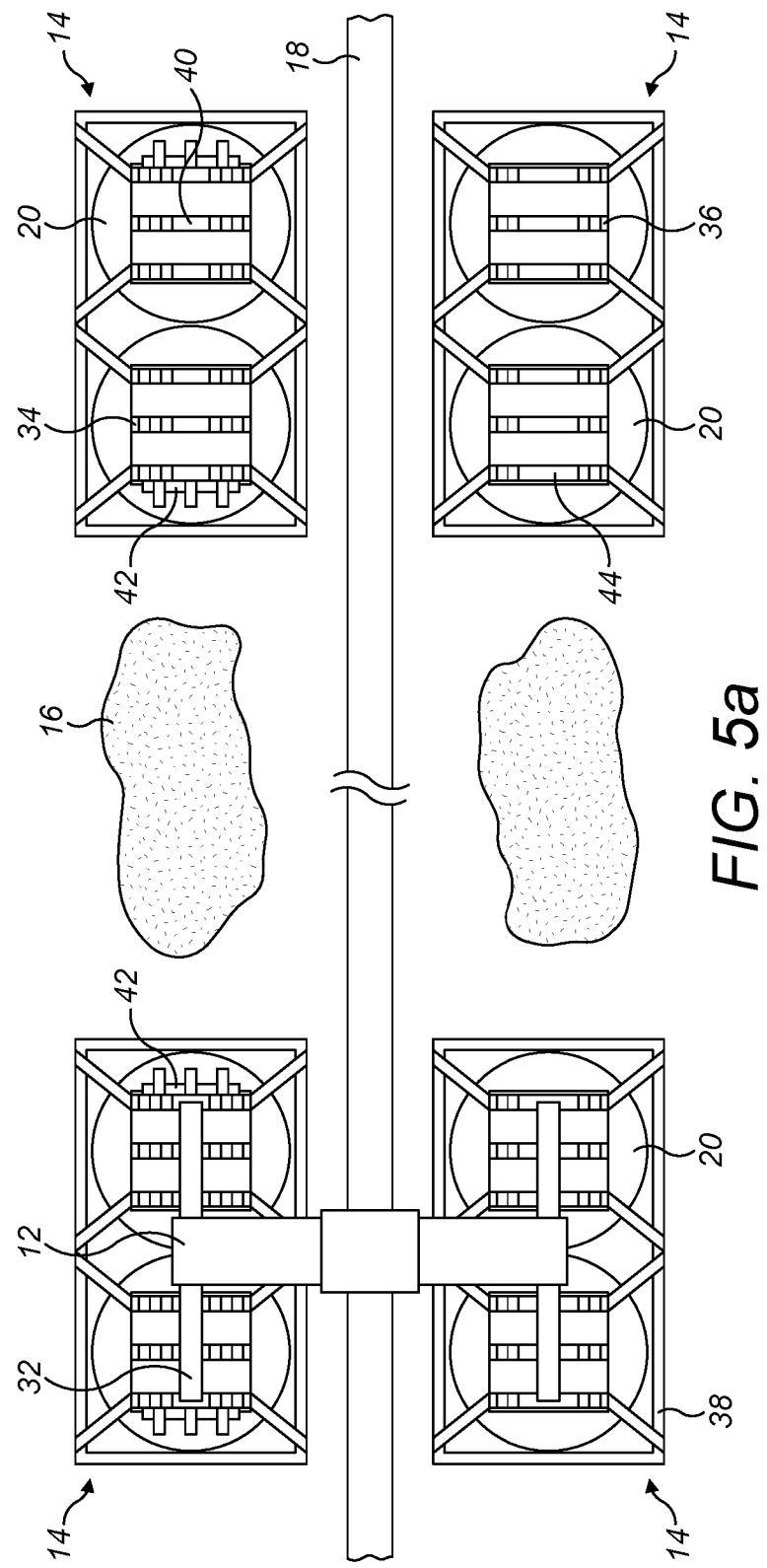
Figure 5B:
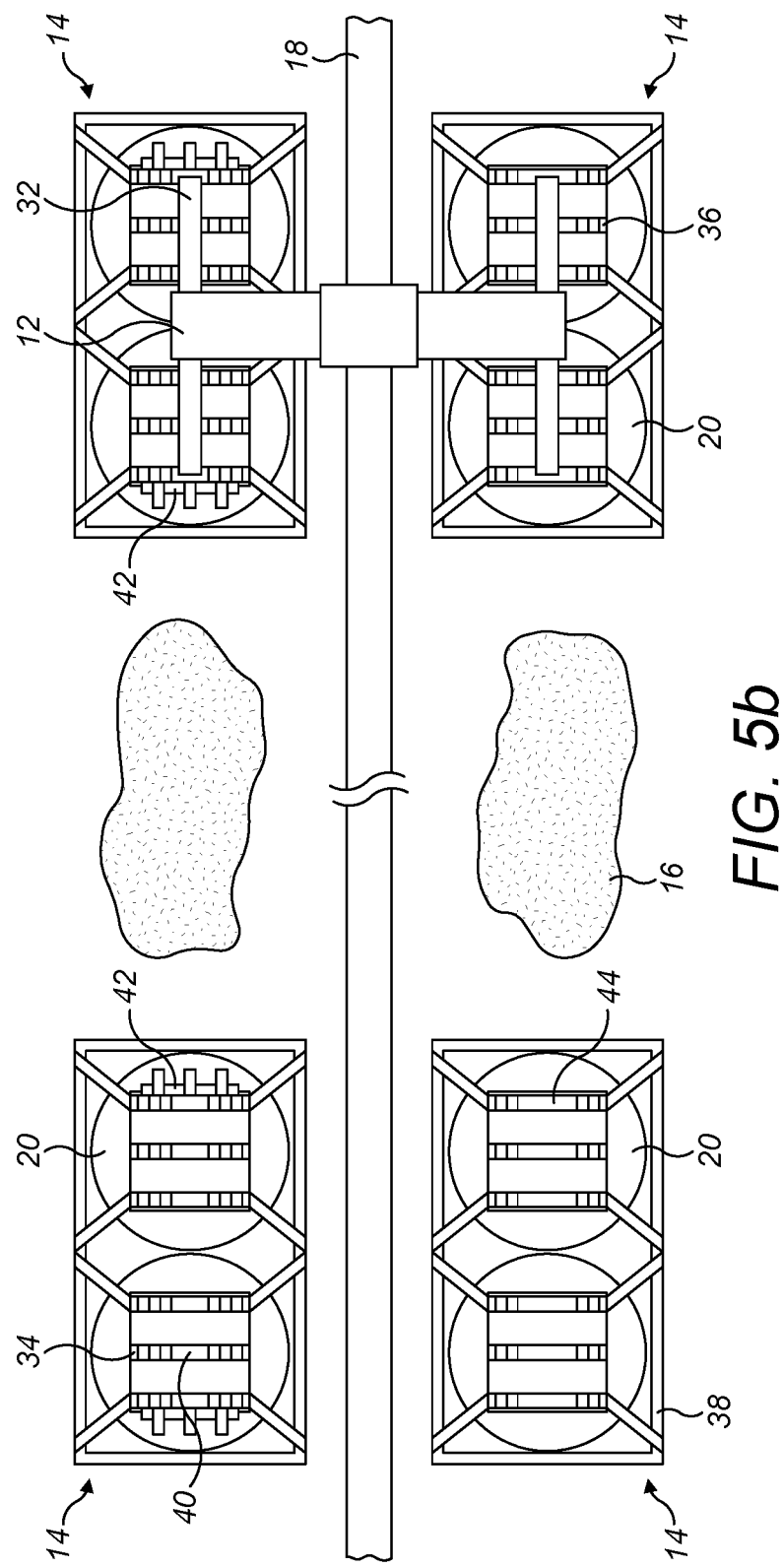
Figure 6:
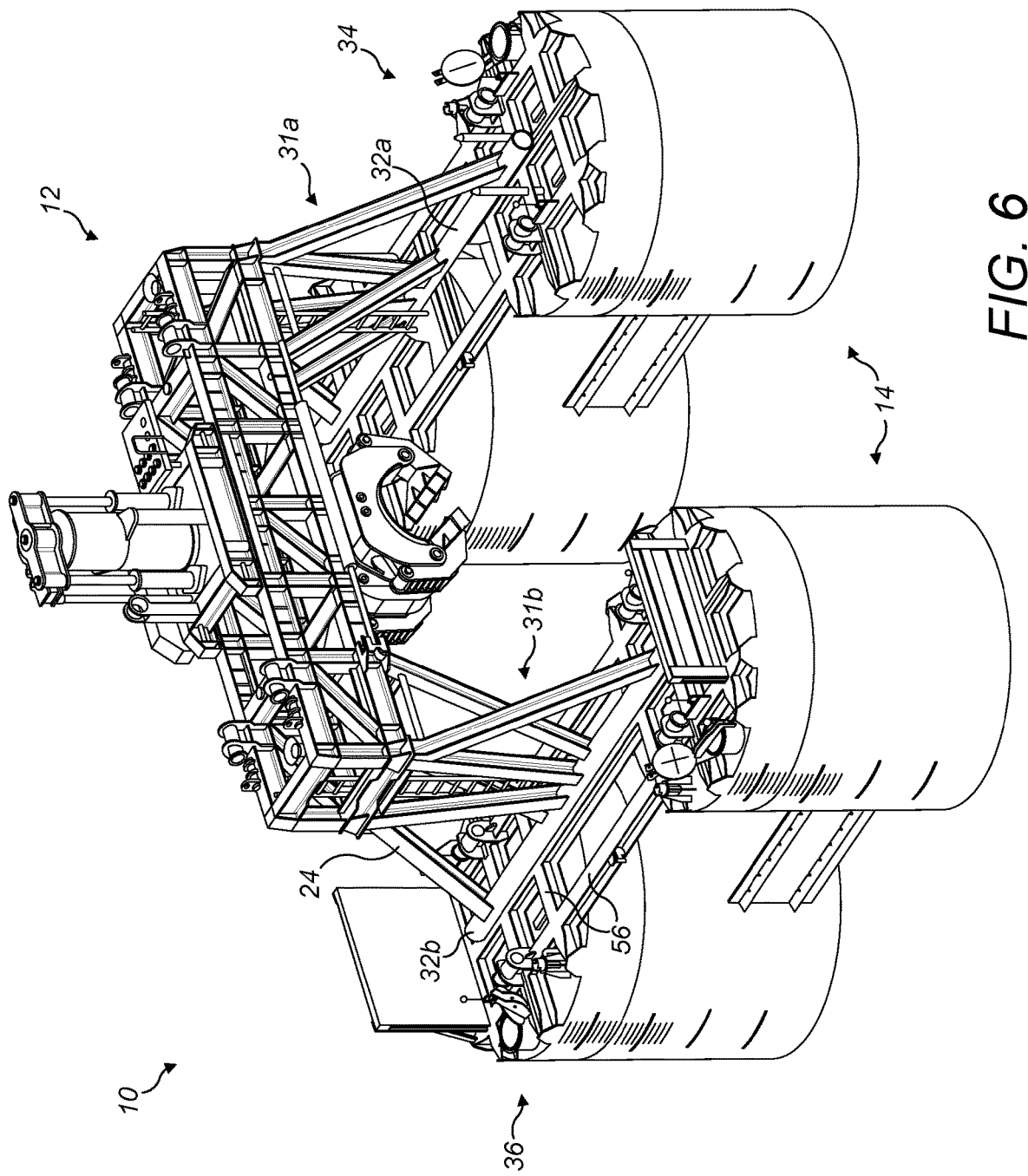
Figure 7:
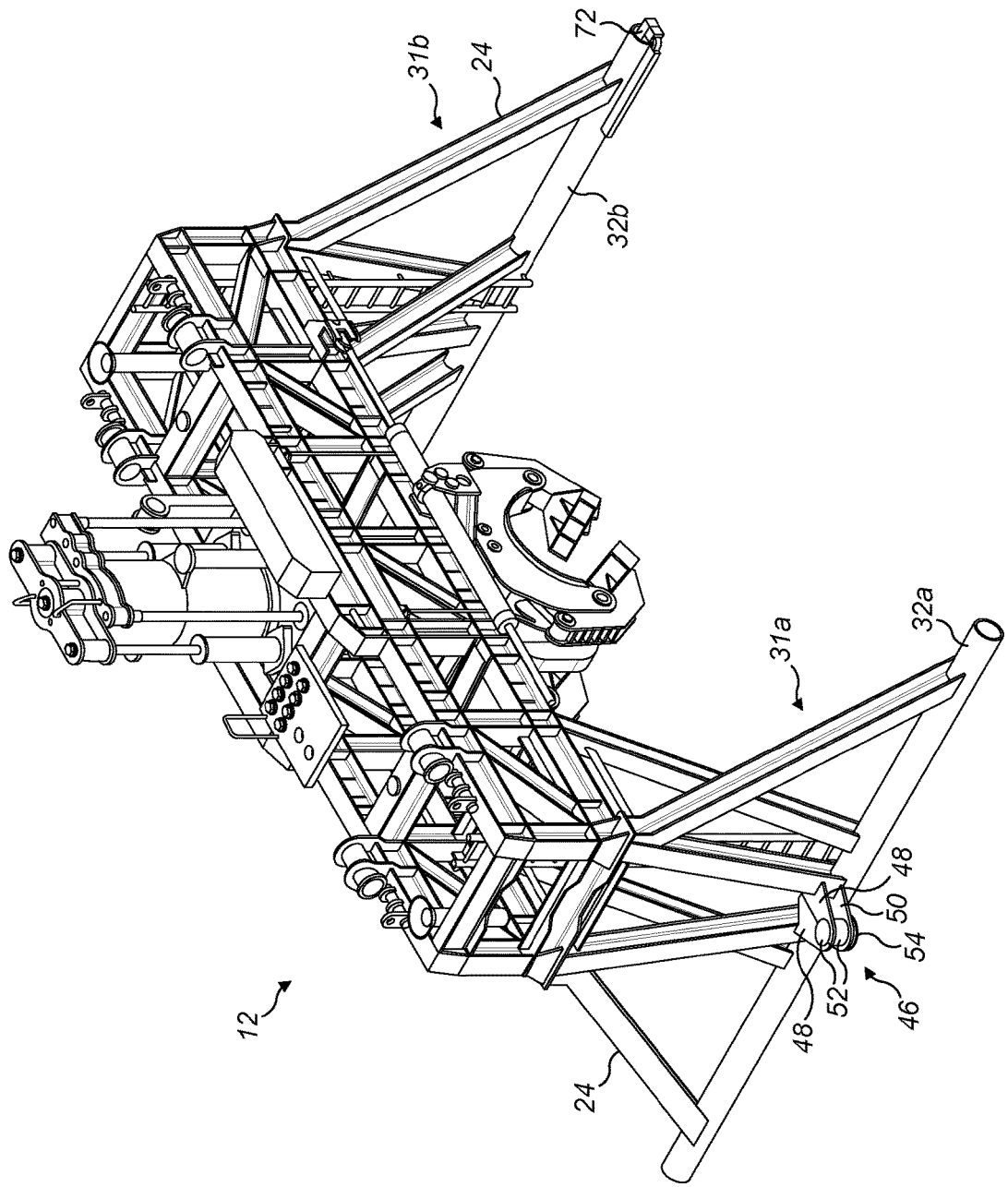
Figure 8:
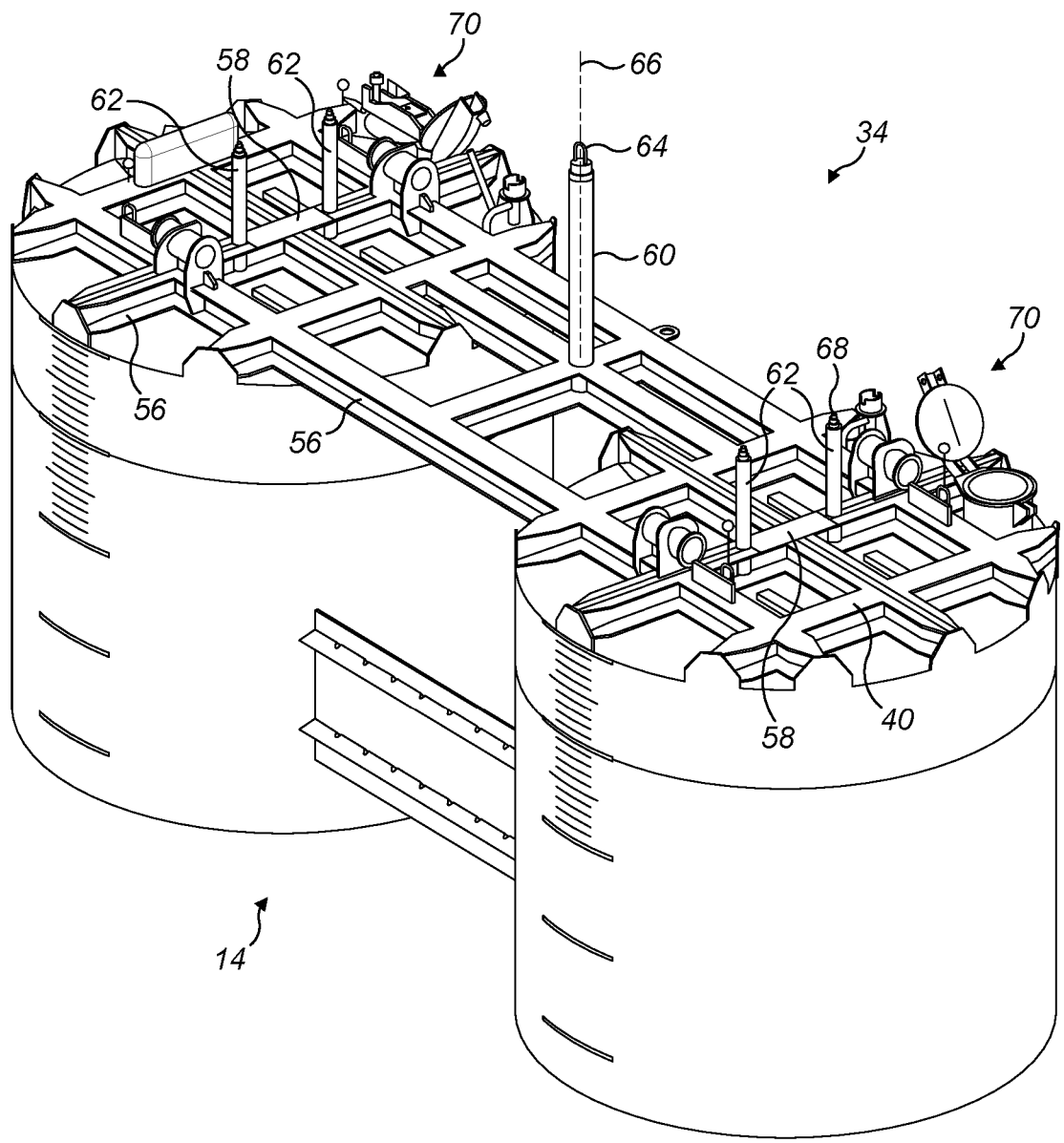
Figure 9:
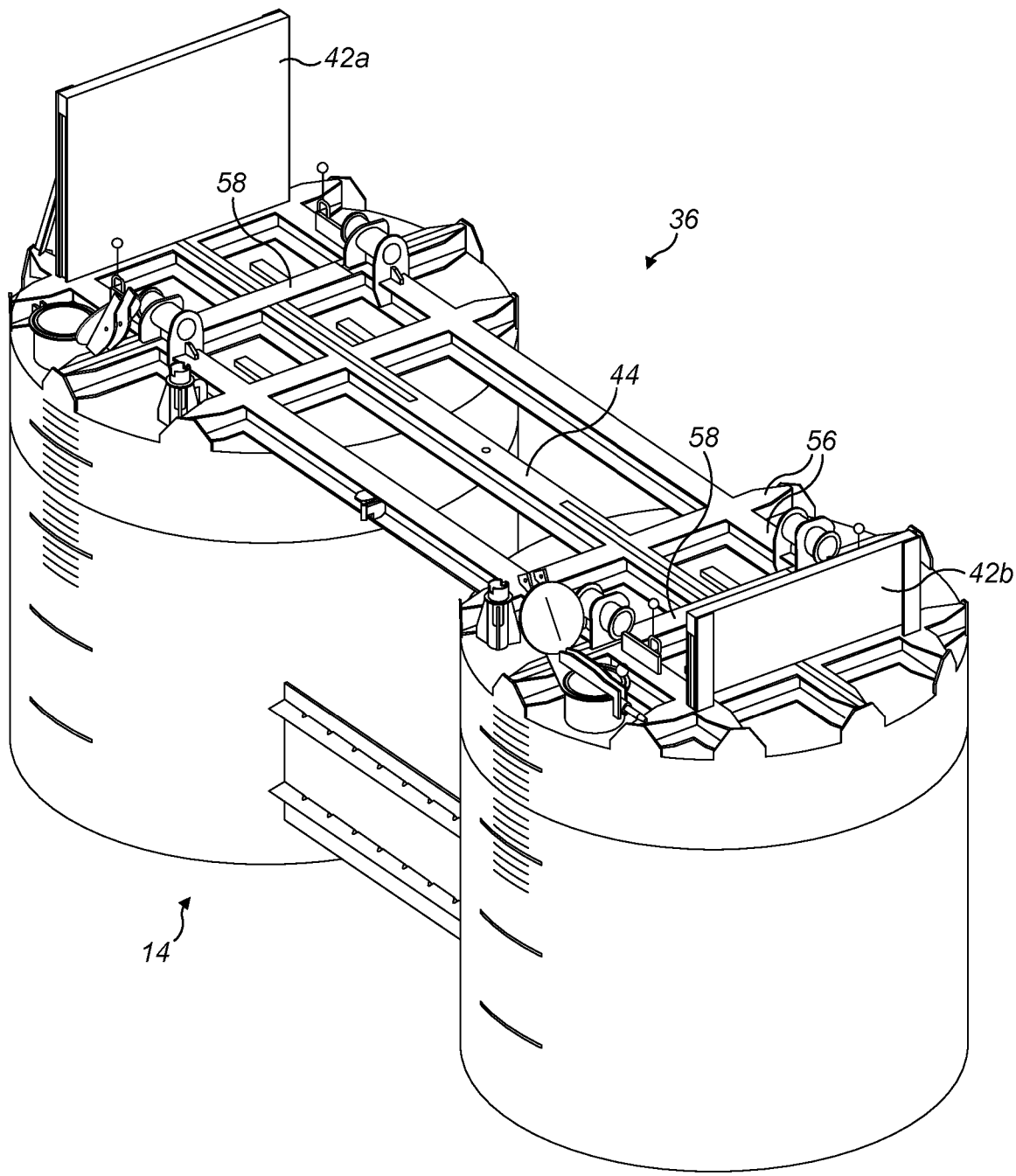
Figure 10:
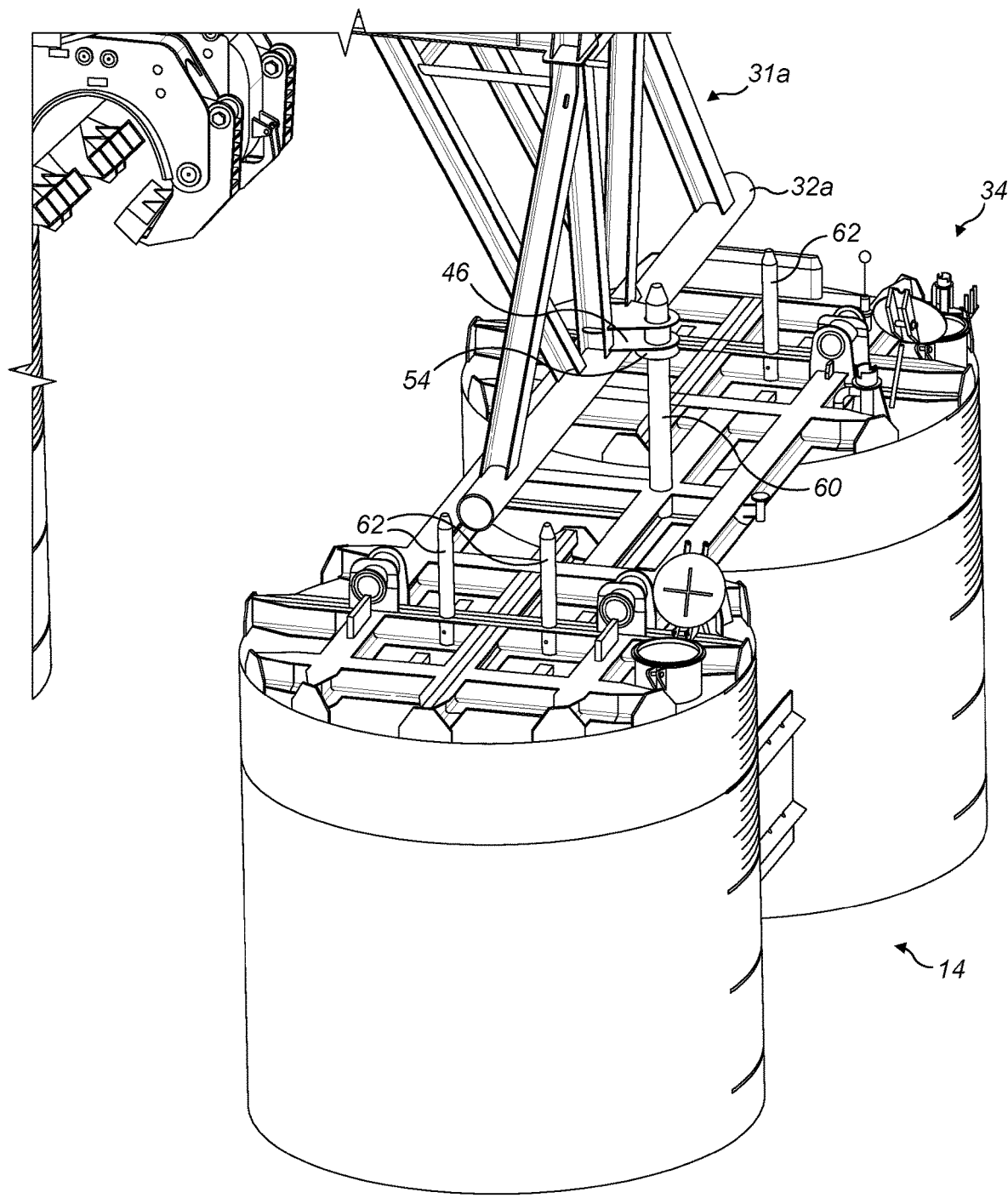
Figure 11:
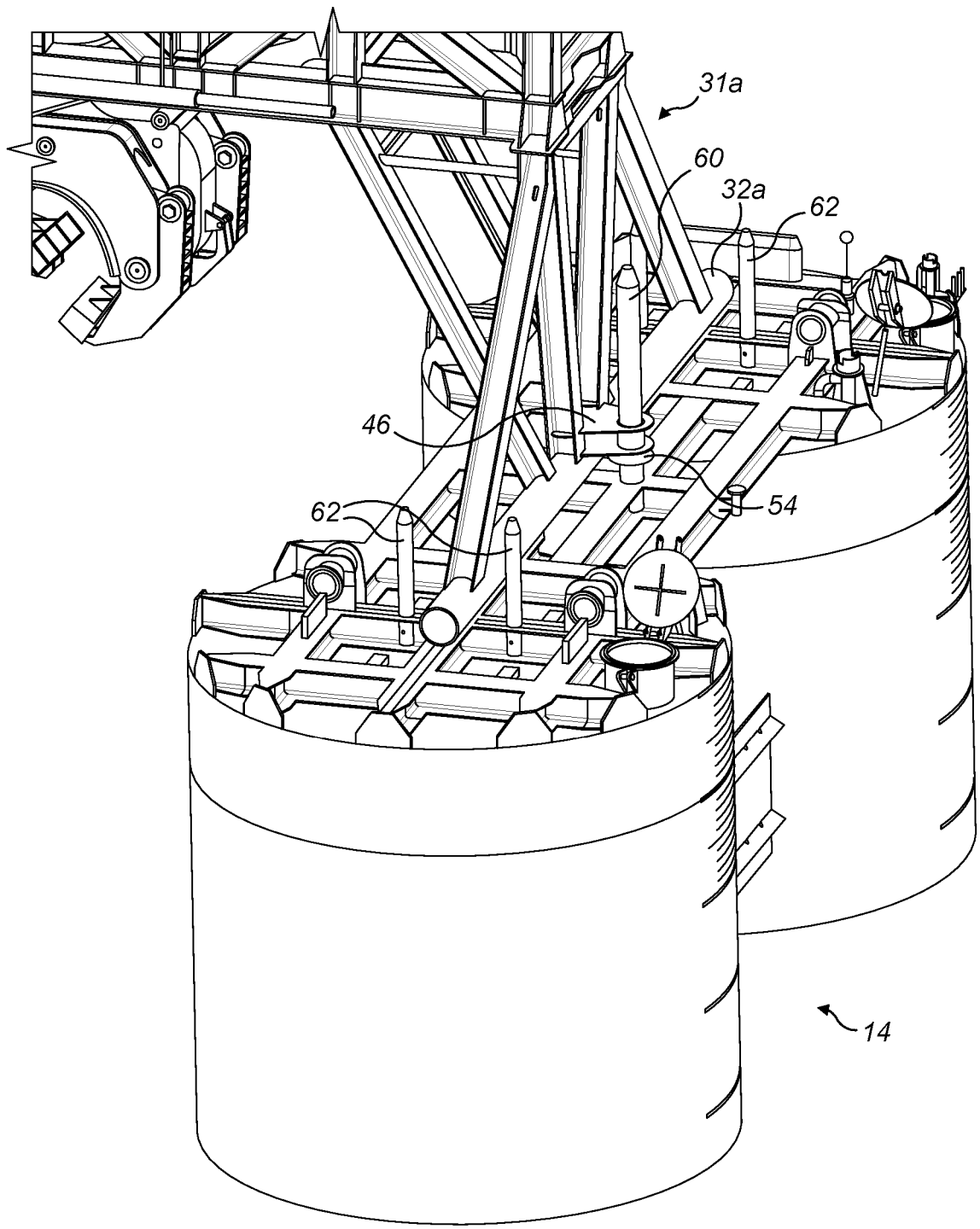
Figure 12:
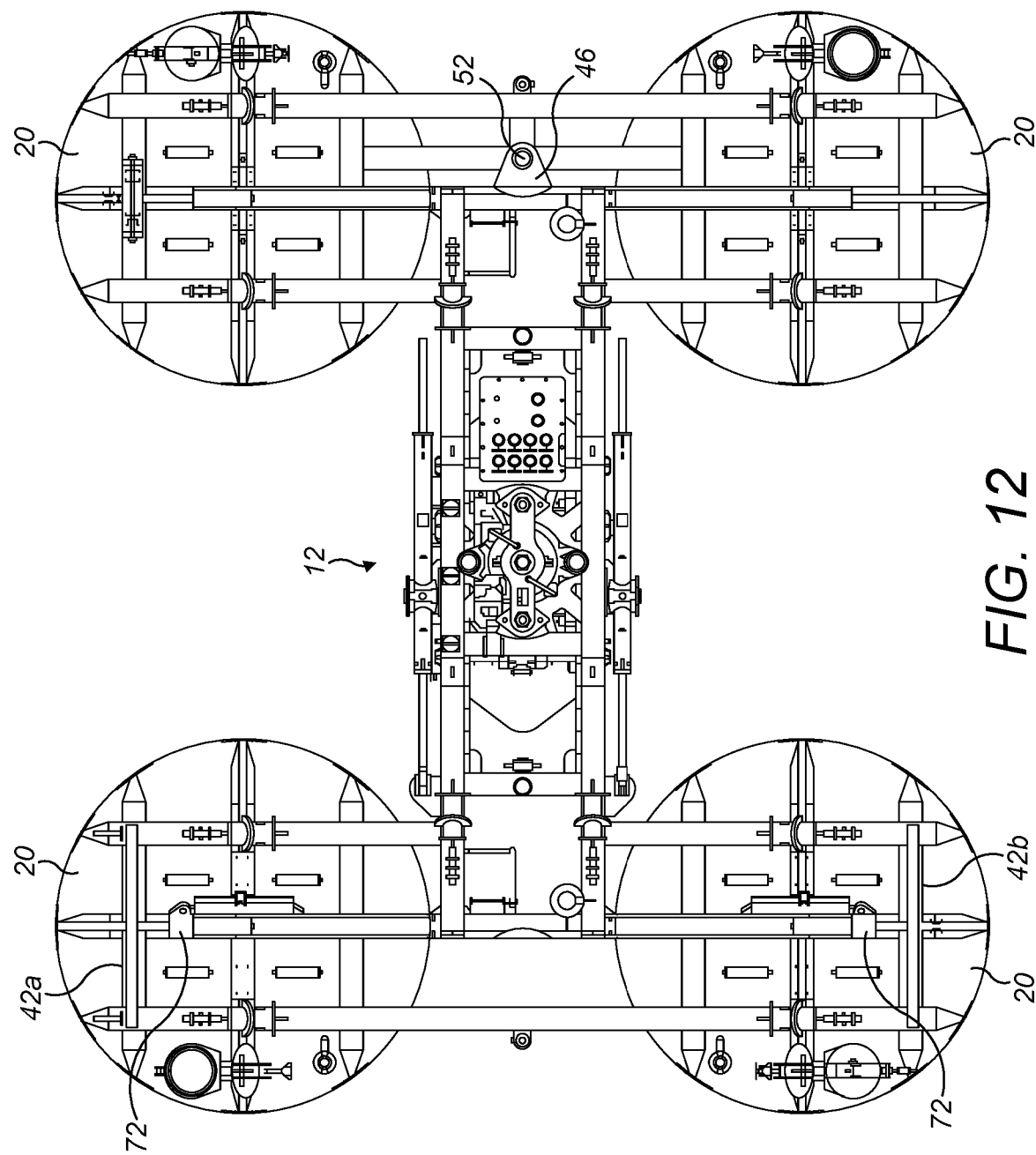

FIG. 4 corresponds to FIG. 3 but shows the foot of the lifting frame engaged with the support formation to complete the hinge;

FIGS. 5a and 5b are schematic plan views of two pairs of foundations of the invention spaced apart longitudinally along a subsea pipeline, showing how a lifting frame of the invention can be moved from one pair of foundations to the other pair of foundations;

FIG. 6 is a perspective view of a subsea pipe lifting and alignment system of another embodiment of the invention, showing a lifting frame mounted on a pair of foundations;

FIG. 7 is a perspective view of the lifting frame of FIG. 6 in isolation;

FIG. 8 is a perspective view of one of the foundations of FIG. 6, showing a support formation on top of the foundation, and a support post of the support formation that serves as a component of a hinge;

FIG. 9 is a perspective view of the other foundation of FIG. 6, showing a support formation on top of the foundation;

FIG. 10 is a perspective view of the system of FIG. 6, showing an engagement formation of the lifting frame engaged with the support post of the support formation of FIG. 8 to complete the hinge;

FIG. 11 corresponds to FIG. 10 but shows the lifting frame lowered further towards the foundations;

FIG. 12 is a plan view of the system of FIG. 6; and

Figure 13:
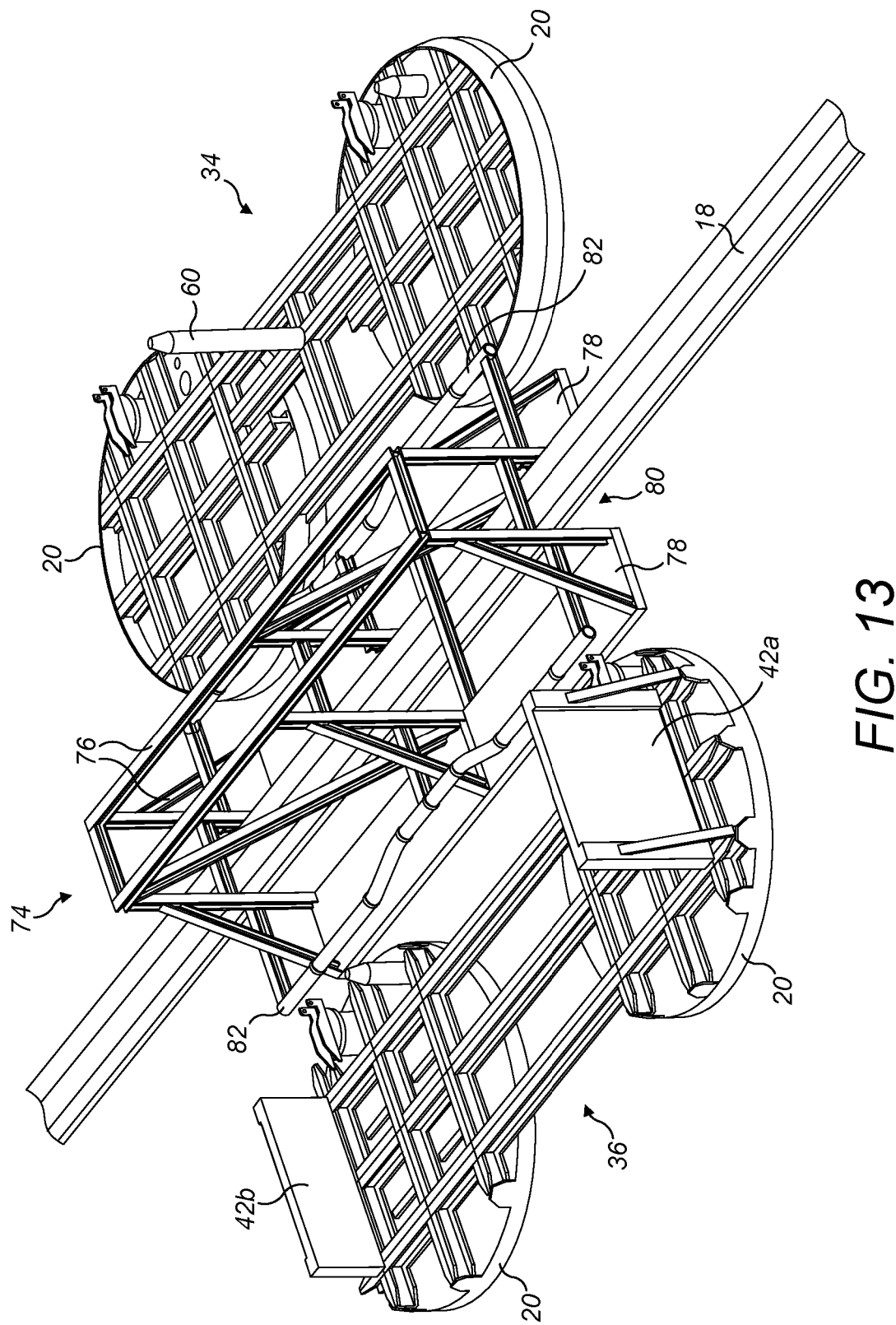

FIG. 13 is a perspective view of a pair of foundations embedded in the seabed about a positioning frame.

Figure 1:
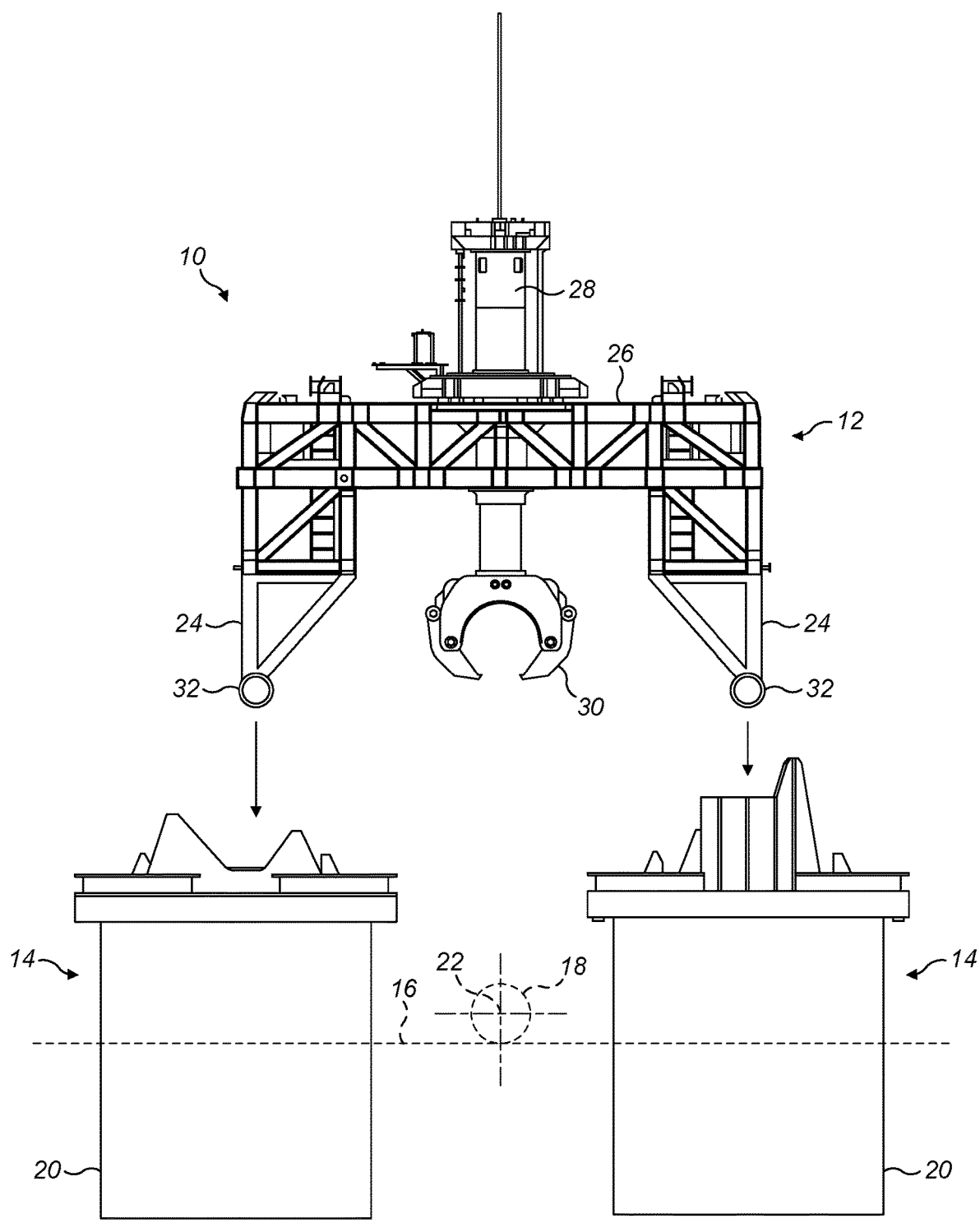
FIG. 1 is an end view of a subsea pipe lifting and alignment system of the invention, showing a lifting frame being lowered onto a pair of foundations embedded in the seabed.

Referring firstly to FIG. 1 of the drawings, a subsea pipe lifting and alignment system 10 of a first embodiment comprises a lifting frame 12 that is removably mountable on a preinstalled pair of subsea foundations 14. The lifting frame 12 is shown here being lowered onto the foundations 14, which are embedded in the seabed 16 in this example. A subsea pipeline 18 is also shown here in cross section, laid on the seabed 16 and straddled by the foundations 14.

More specifically, the foundations 14 comprise parallel suction piles 20 that are embedded into the seabed 16 by conventional techniques. The suction piles 20 are spaced apart from each other to accommodate the pipeline 18 between them. The suction piles 20 are mutually aligned in a common vertical plane that is substantially orthogonal to the central longitudinal axis 22 of the pipeline 18.

In this example, the lifting frame 12 comprises a truss structure that defines parallel, mutually spaced columns or uprights 24 joined together by a beam or cross-member 26. The cross-member 26 supports a conventional lifting system 28 around its mid-point. Thus, the lifting system 28 includes a grab 30 that is capable of being lowered to engage the pipeline 18 and then being raised to lift the pipeline 18 clear of the seabed 16.

Figure 2:
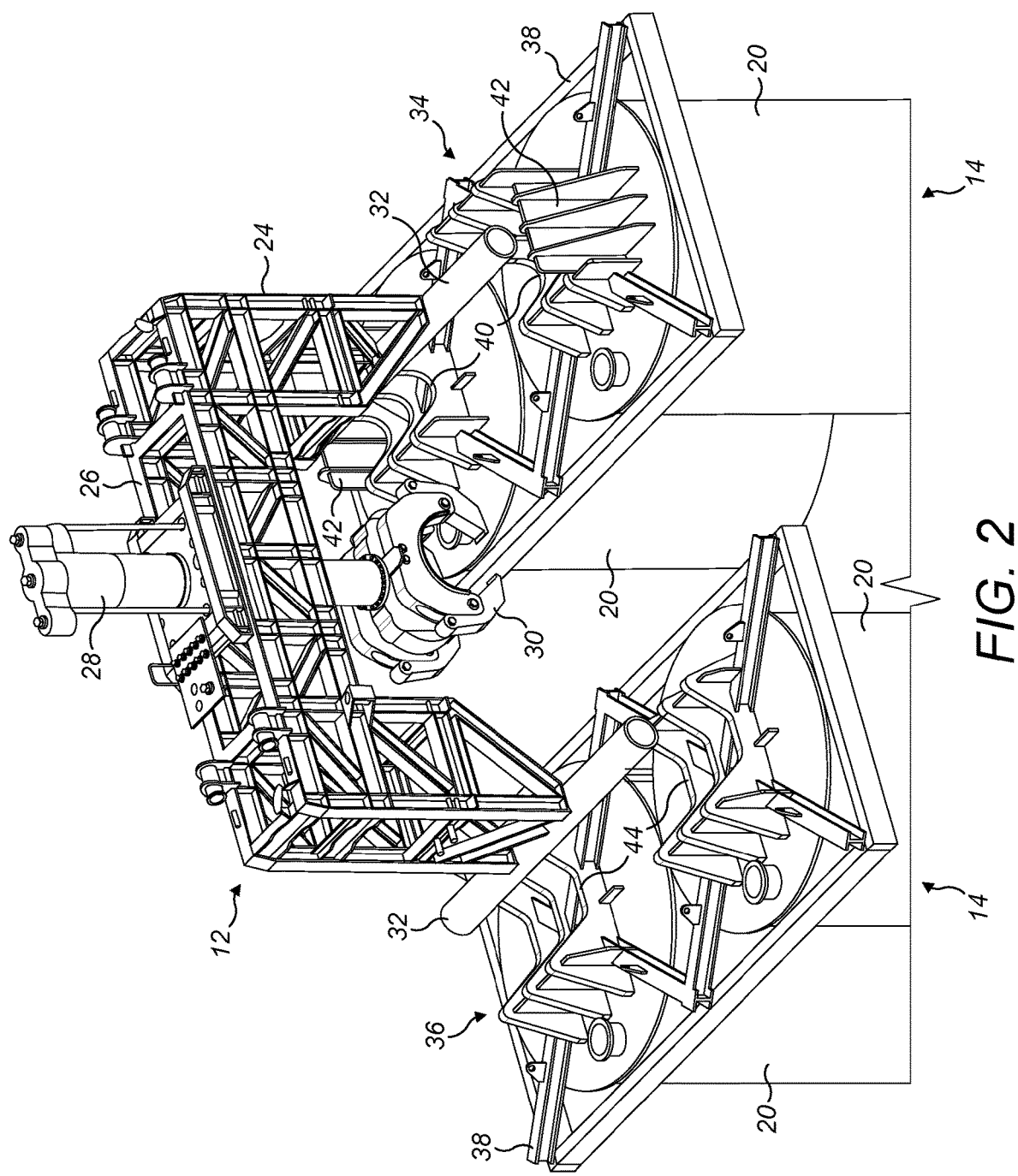
FIG. 2 is a perspective view of the system of FIG. 1, showing feet of the lifting frame approaching respective support formations on top of the foundations.

With reference now also to FIG. 2, the uprights 24 terminate downwardly in respective skids, shoes or feet 32. In this example, the feet 32 are substantially identical and lie in a common horizontal plane. More particularly, the feet 32 are elongate and extend parallel to each other with mutual spacing. When the lifting frame 12 is installed on the foundations 14, the feet 32 also extend substantially parallel to the central longitudinal axis 22 of the pipeline 18.

Each foot 32 is of substantially part-circular cross section, at least on its downward side. In this example, the feet 32 are cylindrical in outer shape and are hollow internally, being tubular and open-ended.

The suction piles 20 support respective upwardly-facing support formations 34, 36 that together cooperate with the feet 32 to define the interface between the foundation 14 and the lifting frame 12. For this purpose, the support formations 34, 36 are arranged to align with and to receive the feet 32. Thus, the support formations 34, 36 are also elongate, extend parallel to each other with mutual spacing, and extend substantially parallel to the central longitudinal axis 22 of the pipeline 18.

It will be evident from FIG. 2 that each suction pile 20 shown in FIG. 1 is only one of a group of suction piles 20 on each side of the pipeline 18. Each of those groups defines a respective one of the pair of foundations 14. The suction piles 20 of each foundation 14 are held together by an upper frame 38.

In this example, each foundation 14 comprises two suction piles 20 that are aligned in a vertical plane extending substantially parallel to the central longitudinal axis 22 of the pipeline 18. Thus, each foundation 14 is longitudinally elongate and the support formations 34, 36 extend longitudinally along the upper frame 38 of the foundation 14 from one suction pile 20 to the other.

The support formations 34, 36 are each divided between the suction piles 20 of each foundation 14. Each of the support formations 34, 36 is defined by a longitudinal series of parallel transverse plates that are shaped so as to define, collectively, a downwardly-narrowing channel for receiving a respective one of the feet 32. Each channel is upwardly concave, that is, concave when viewed from above through its open top.

Turning next to FIGS. 3 and 4, the support formation 34 serves as one component of a hinge. One of the feet 32 of the lifting frame 12 serves as the other component of that hinge. For this purpose, the channel of the support formation 34 has a base 40 of substantially circular or elliptical curvature that complements the radius of curvature of that foot 32. Thus, the hinge is completed by engaging the foot 32 with the base 40 of the channel defined by the support formation 34 as shown in FIG. 4. The foot 32 is then retained against longitudinal movement by end plates 42 of the support formation 34 that close the ends of the channel.

The foot 32, thus engaged to complete the hinge, can pivot relative to the support formation 34. This allows the lifting frame 12 to tilt away from the horizontal, hence compensating for any differences in level between the foundations 14 to opposite sides of the pipeline 18.

Conversely, the support formation 36 serves as a platform on which the other foot 32 of the lifting frame 12 can rest within a support area. To define that platform and the support area, the channel of the support formation 36 has a relatively flat base 44 that is substantially wider than that foot 32 and that is open-ended. Thus, the foot 32 can rest on the base 44 of the support formation 36 in various relative positions both laterally and longitudinally within the support area. This freedom of positioning compensates for any differences in lateral spacing or longitudinal alignment between the foundations 14 to opposite sides of the pipeline 18.

It will be apparent that if the feet 32 are of identical diameter or at least are both capable of engaging within the base 40 of the support formation 34, the orientation of the lifting frame 12 about a vertical axis can be reversed. In other words, the lifting frame 12 can be mounted on a pair of foundations 14 in either of two orientations that are 180° apart. This makes it easier to align the lifting frame 12 with the foundations 14 and saves installation time.

Turning to FIGS. 5a and 5b, these schematic drawings show two pairs of foundations 14 that are spaced apart longitudinally along the pipeline 18. One pair of foundations 14 is at a location where the pipeline 18 requires a first intervention and the other pair of foundations 14 is at a location where the pipeline 18 requires a second, subsequent intervention.

FIG. 5a shows the lifting frame 12 mounted on one of the pairs of foundations 14, with its feet 32 received by the support formations 34, 36 atop the suction piles 20. FIG. 5b shows the lifting frame 12 transferred to, and similarly mounted on, the other pair of foundations 14.

In practice, a set of lifting frames 12 would be used in series where the pipeline 18 requires a first intervention. The lifting frames 12 can then be moved as a set to another location where the pipeline 18 requires a second intervention. Indeed, one or more lifting frames 12 could be transferred to another, different pipeline requiring intervention, provided that the other pipeline is accompanied by pairs of foundations like the pipeline 18 as illustrated.

FIG. 6 illustrates a second embodiment of the subsea pipe lifting and alignment system 10 that has a number of features in common with the system of the first embodiment of FIGS. 1 to 5. Like reference numerals are therefore used for like features.

As in the first embodiment, the subsea pipe lifting and alignment system 10 of the second embodiment comprises a lifting frame 12 that engages with support formations 34, 36 when installed on a preinstalled pair of subsea foundations 14.

The uprights 24 of the lifting frame 12 comprise a first leg 31a that terminates downwardly in a first foot 32a and a second leg 31b that terminates downwardly in a second foot 32b. As in the first embodiment, each foot 32a, 32b is elongate and cylindrical in shape, and the feet 32a, 32b extend parallel to each other.

Referring to FIG. 7 in particular, the lifting frame 12 of the second embodiment further comprises an engagement formation in the form of a bracket 46 for engaging with the support formation 34, as will be explained. The bracket 46 extends outwardly from the first leg 31a of the lifting frame 12, and is positioned centrally along the length of the first leg 31a. As best seen in FIGS. 10 and 11, the bracket 46 extends from a position on the leg 31a of the lifting frame 12 that is just above the foot 32a.

The bracket 46 comprises an upper plate 48 and a lower plate 50. The upper and lower plates 48, 50 are parallel to and vertically spaced from one another. Each plate 48, 50 is cantilevered from the leg 31a, and outwardly tapered in plan view, as best seen in FIG. 12. Each plate 48, 50 comprises a hole 52 that extends through the thickness of the plate 48, 50. The holes 52 of the plates 48, 50 are aligned on a mutual vertical axis. Thus, the holes 52 together define an opening through the bracket 46.

A frustoconical guide 54 aligned with the holes 52 splays downwardly from the underside of the lower plate 50.

Referring now to FIGS. 8 and 9 in particular, each of the support formations 34, 36 comprises an array of flat topped beams 56 that extend longitudinally and laterally across the foundations 14. The longitudinal and lateral beams 56 together define platforms and comprise bearing pads 58 on which the feet 32a, 32b rest when the lifting frame 12 is mounted on the foundations 14. The longitudinal beams 56 extend from one pile 20 of each foundation 14 to the other, thus bridging the two piles 20 of each foundation 14.

The support formation 34 further comprises a support pillar or post 60 for engaging with the bracket 46, and a plurality of guide posts 62, as best seen in FIG. 8. Each guide post 62 is upstanding from the base 40 of the support formation 34.

The post 60 is generally cylindrical and extends vertically upwards from a laterally offset longitudinal beam 56 of the support formation 34. The post 60 is positioned centrally along the length of the foundation 14. The post 60 includes an attachment point 64 provided at its upper end to which a wire or cable (not shown) may be attached to assist in alignment and engagement of the bracket 46 with the post 60 during installation. In this embodiment, when engaged, the post 60 of the support formation 34 serves as one component of a hinge, and the bracket 46 of the lifting frame 12 serves as the other component of the hinge. The hinge defines a vertical pivot axis 66 about which the lifting frame 12 can pivot during installation.

Each guide post 62 is generally cylindrical and extends vertically upwards from a lateral beam 56 of the support formation 34 to a narrowed tip 68. In this embodiment, the guide posts 62 are arranged in pairs 70 that are mutually spaced longitudinally along the foundation 14, with one pair 70 provided on each pile 20 of the foundation 14. The guide posts 62 of each pair 70 are spaced laterally apart from one another.

The guide posts 62 together delimit a support area of the base 40 that is substantially wider than the foot 32a and that is open-ended to allow the foot 32a to rest on the base 40 of the support formation 34 in various relative positions both laterally and longitudinally within the support area.

Turning now to FIG. 9, the support formation 36 comprises a first end plate or wall 42a and a second end plate or wall 42b. The end walls 42a, 42b are mutually opposed and extend upwardly from lateral beams 56 of the support formation 36.

The foot 32b may be provided with hydraulic rams 72 (best seen in FIGS. 7 and 12) that are arranged to engage with one or both of the end walls 42a, 42b to adjust the longitudinal position of the foot 32b and/or to restrain the foot 32b against longitudinal movement when the lifting frame 12 is installed on the foundations 14.

To install the lifting frame 12 of the second embodiment on the foundations 14, the post 60 of the support formation 34 is received in the opening of the bracket 46 as the lifting frame 12 is lowered towards the foundations 14, as shown in FIGS. 10 and 11. Engaged in this way, the post 60 and the bracket 46 define the hinge which allows the bracket 46, and thus the lifting frame 12, to pivot about the vertical pivot axis 66 defined by the post 60.

If needed, the lifting frame 12 can be rotated about the post 60 at this stage to orient the foot 32a such that the foot 32a is received between the guide posts 62 as the lifting frame 12 continues to be lowered as shown in FIG. 11. To enable this rotation to take place once the bracket 46 engages the post 60, the guide posts 62 and the end plate 42b are shorter than the post 60 and therefore extend vertically from the foundation 14 to a lesser extent than the post 60. The end plate 42a is substantially the same height as the post 60 such that it may limit further rotation of the lifting frame 12 about the post 60. Once the lifting frame 12 is oriented appropriately, the lifting frame 12 is lowered into the installed position on the foundations 14 as shown in FIG. 6.

Referring to FIG. 13, a positioning frame 74 may be used to ensure that the foundations 14 are appropriately spaced apart from each other to allow for installation of the lifting frame 12. The positioning frame 74 comprises a plurality of struts 76 arranged on two rectangular bases 78 to define a longitudinal channel 80 that extends through the length of the positioning frame 74. The positioning frame 74 is dimensioned such that, when arranged on the seabed with the pipeline 18 extending through the longitudinal channel 80, arms 82 of the positioning frame 74 indicate the location at which the foundations 14 should be installed. In this way, correct positioning of the foundations 14 about the pipeline 18 can be achieved. It will be noted from FIG. 13 that in some embodiments the guide posts 62 of the support formation 34 may be omitted.

It will be apparent that the invention provides a simple, easy to use interface between the lifting frames 12 and the foundations 14. Despite its simplicity, the interface compensates readily for dimensional variations in the foundations 14, in particular for any disparity in level, spacing or longitudinal position between the paired foundations 14 on opposite sides of the pipeline 18. Yet, the interface provides secure location of the lifting frame 12 relative to the foundations 14.

Many variations are possible within the inventive concept. For example, foundation arrangements other than suction piles would be possible, such as pin piles or, indeed, substantially non-embedded foundations such as mudmats. Furthermore, the hydraulic rams 72 may be provided on the foundation 14 itself rather than on the foot 32b of the lifting frame 12.

The invention claimed is:
1. A lifting system for a subsea pipeline comprising:
at least one pair of subsea foundations that are installed at a seabed and spaced apart from each other to define a gap between the foundations of the at least one pair of subsea foundations through which the pipeline extends; and
a removable lifting frame arranged to be removably mountable on the installed foundations to bridge over the pipeline disposed in the gap; wherein:
the lifting frame comprises a pair of feet, wherein the pair of feet are cooperable with respective support formations on the respective foundations, and wherein at least a downward side of each foot is of substantially part-circular or part-elliptical curvature;

a first one of the support formations comprises a hinge component to restrain one of the feet for pivotal movement relative to the first one of the support formations; and a second one of the support formations is shaped to define a platform on which the other foot can rest in any of various positions within a support area.

2. The lifting system of claim 1, wherein the first support formation comprises a support post that defines the hinge component.

3. The lifting system of claim 1, wherein the lifting frame comprises an engagement formation that defines another hinge component.

4. The lifting system of claim 3, wherein the first support formation comprises a support post that defines the hinge component and wherein the engagement formation comprises an opening for receiving the support post.

5. The lifting system of claim 4, wherein the support post extends upwardly from the respective foundation of the at least one pair of subsea foundations to define a vertical axis about which the lifting frame can pivot when the support post is received in the opening of the engagement formation.

6. The lifting system of claim 3, wherein the engagement formation extends outwardly from a leg of the lifting frame.

7. The lifting system of claim 1, wherein the first support formation comprises a plurality of guide posts arranged to delimit a support area of the first support formation in which one of the feet can rest in any of various positions.

8. The lifting system of claim 7, wherein the guide posts extend vertically upwards from the respective foundation of the at least one pair of subsea foundations to a lesser extent than a support post.

9. The lifting system of claim 1, wherein the support formations each comprise an upwardly opening, downwardly narrowing channel.

10. The lifting system of claim 1, wherein the first support formation or the second support formation further comprises end walls that are positioned to restrain longitudinal movement of one of the feet of the lifting frame engaged therewith.

11. The lifting system of claim 1, wherein the feet lie in a common plane.

12. The lifting system of claim 1, wherein the feet are elongate.

13. The lifting system of claim 12, wherein the feet extend substantially parallel to each other.

14. The lifting system of claim 1, wherein the feet are substantially identical in cross section.

15. The lifting system of claim 1, wherein each foot is cylindrical in outer shape.

16. The lifting system of claim 1, wherein the foundations are arranged to be embedded in seabed soil.

17. The lifting system of claim 16, wherein each foundation comprises at least one suction pile.

18. The lifting system of claim 1, comprising at least two pairs of foundations, at least one of the at least two pairs of foundations not having the lifting frame mounted thereon at any given time.

19. The lifting system of claim 1, wherein the first support formation is shaped to define the hinge component.

20. The lifting system of claim 19, wherein the first support formation comprises a base of substantially part circular or part elliptical curvature.

21. The lifting system of claim 1, wherein the second support formation comprises a substantially flat base that is substantially wider than either foot of the lifting frame.

22. The lifting system of claim 1, wherein the first support formation or the second support formation is open ended.

23. The lifting system of claim 1, wherein the lifting frame is mountable on the foundations in at least two orientations about a vertical axis.

24. The lifting system of claim 23, wherein two of said at least two orientations are 180° apart about the vertical axis.

25. A method of installing a lifting frame for lifting a subsea pipeline, the method comprising:

preinstalling at a seabed at least a first pair of subsea foundations that are spaced apart from each other to define a gap between the foundations of the at least first pair of subsea foundations through which the pipeline extends; and mounting the lifting frame onto the preinstalled foundations to bridge over the pipeline disposed in the gap; wherein a pair of feet of the lifting frame then cooperate with respective support formations on the respective foundations, one of the feet being constrained to pivot relative to a first one of the support formations and the other foot resting on a second one of the support formations with freedom of positioning within a support area of the second one of the support formations.

26. The method of claim 25, comprising engaging an engagement formation of the lifting frame and a support post of the first support formation to define a hinge.

27. The method of claim 26, comprising pivoting the lifting frame about a vertical axis defined by the support post.

28. The method of claim 25, comprising compensating for a difference in level between the foundations of the first pair of subsea foundations by allowing the lifting frame to pivot about the first support formation.

29. The method of claim 25, comprising compensating for a difference in lateral spacing or longitudinal alignment between the foundations of the first pair of subsea foundations by allowing the lifting frame to adopt different positions relative to the second support formation.

30. The method of claim 25, comprising mounting the lifting frame onto the first pair of subsea foundations in one of a plurality of possible orientations about a vertical axis.

31. The method of claim 30, wherein there are two possible orientations, 180° apart about the vertical axis.

32. The method of claim 30, wherein the possible orientations are limited by guide posts of the first support formation.

33. The method of claim 25, further comprising subsequently transferring the lifting frame to another location by dismounting the lifting frame from the first pair of foundations and then mounting the lifting frame onto a second pair of the subsea foundations in a corresponding manner.

34. The method of claim 33, wherein the other location is along the same pipeline.

35. The method of claim 33, wherein the other location is on a different pipeline.

* * * * *